United States Patent
Workman et al.

(10) Patent No.: US 9,065,280 B2
(45) Date of Patent: Jun. 23, 2015

(54) SYSTEM AND METHOD OF USING HIGH ENERGY BATTERY PACKS

(71) Applicant: Zero Motorcycles, Inc., Scotts Valley, CA (US)

(72) Inventors: Lucas Remington Workman, Scotts Valley, CA (US); Nathan Glenn Knight, Santa Cruz, CA (US); Andrew Martin Letton, Redwood Estates, CA (US); Kenyon Michael Kluge, Santa Cruz, CA (US); Abraham Askenazi, San Jose, CA (US)

(73) Assignee: Zero Motorcycles, Inc., Scotts Valley, CA (US)

( * ) Notice: Subject to any disclaimer, the term of this patent is extended or adjusted under 35 U.S.C. 154(b) by 395 days.

(21) Appl. No.: 13/633,419

(22) Filed: Oct. 2, 2012

(65) Prior Publication Data

US 2014/0091751 A1    Apr. 3, 2014

(51) Int. Cl.
*H02J 7/00*    (2006.01)

(52) U.S. Cl.
CPC ............. *H02J 7/0013* (2013.01); *H02J 7/0016* (2013.01); *H02J 7/0024* (2013.01)

(58) Field of Classification Search
CPC ...................................... H02J 7/0013
USPC .................................. 320/106, 126
See application file for complete search history.

(56) References Cited

U.S. PATENT DOCUMENTS 7,059,769 B1 *   6/2006   Potega ........................... 374/185

* cited by examiner

*Primary Examiner* — Sun Lin
(74) *Attorney, Agent, or Firm* — Gard & Kaslow LLP

(57) ABSTRACT

An energy storage system having one or more battery packs and a system controller for controlling the battery packs. Each battery pack has rechargeable storage cells and a battery pack controller in communication with the system controller. Through the operation of the system controller, battery packs with different initial charge states can be operated in parallel during a charge process and a discharge process. Discharging multiple battery packs in parallel offers not only a higher capacity and a longer run time than is available from a single battery pack, but also offers higher peak currents than available from a single battery pack, which are important in motor control applications. A battery pack design including a battery pack connector with both power and control contacts supporting user replacement of the battery packs.

15 Claims, 4 Drawing Sheets

SYSTEM AND METHOD OF USING HIGH ENERGY BATTERY PACKS

BACKGROUND

1. Field of the Invention

The present invention relates generally to battery packs, and more particularly to the construction and operation of high energy battery packs, particularly in environments where multiple battery packs may be used.

2. Description of the Prior Art

Batteries and battery packs in electrically operated devices are commonplace. Devices such as flashlights and remote controls are often powered by a single-use AA or AAA cell, known as a primary (non-rechargeable) cell, which must be replaced when depleted.

In devices such as cell phones, video cameras, and laptop computers, individual secondary (rechargeable) cells are packaged together in a battery pack which can go through multiple charge—discharge cycles. In many of these devices, the battery pack may be removed and replaced by the user.

A given battery pack has a specific design capacity which defines the operating time of the device it powers. As a result, a user of a device powered by such a battery pack must typically recharge or replace a depleted battery pack for extended device operating times, or power over time.

Some laptop computers are configured to contain two separate battery packs. While this does provide for longer laptop operating time, the two battery packs are used sequentially, with one battery pack being used until it is depleted, the laptop then switching to using the other battery pack.

The Giant® Twist Freedom electric bicycle can carry one or two battery packs, using one battery pack at a time to power an electric motor on the bicycle. While the ability to carry two battery packs extends the operating range, the Giant Twist Freedom requires the rider to manually select one battery pack to operate the motor, and then manually select the other battery pack when the first battery pack is depleted. When a battery pack is depleted, it must be removed from the bicycle for charging. Charging two battery packs at the same time requires two chargers.

What is needed is to be able to use multiple battery packs in a way that gives the user longer operating time and more operating power than is available from using a single battery pack at a time.

SUMMARY

In one embodiment is provided an energy storage system for multiple battery packs. The energy storage system comprises one or more battery packs, and a master controller communicating with battery controllers in the individual battery packs. Under control of the master controller, the energy storage system uses multiple battery packs at the same time when multiple battery packs are present.

The battery packs comprise series connected rechargeable storage cells, switches to isolate the storage cells from power contacts on the battery pack, battery pack sensors for sensing the state of the storage cells, a current sensor, a battery pack connector for power and control signals, and a battery controller which operates the battery pack and communicates with the master controller. Battery packs may be removed and replaced by the user.

When a battery pack is removed, the battery controller puts the battery pack in a safe state where voltage is not present on the battery pack power contacts.

When a battery pack is replaced in the energy system, the master controller and the battery controller work together in charging or discharging the battery pack.

When charging battery packs, the master controller identifies connected battery packs and gets charge information from each battery controller. If only one pack is present, that pack is charged. When multiple battery packs are identified, the master controller selects as a first battery pack the battery pack with the lowest charge level. The first battery pack is placed in a charge mode by the master controller signaling the battery controller in the first battery pack to close the switches in the battery pack to connect the rechargeable energy cells to an external power source. As the first battery pack is charged, the master controller compares its charge state to the charge state of a second remaining battery pack with the lowest charge state. When the charge states of the first and second battery packs are within a threshold value, the master controller signals the battery controller in the second battery pack to place the second battery pack into the charge mode, placing it electrically in parallel with the first battery pack connected to the external power source, thus charging multiple battery packs at the same time.

When discharging battery packs (e.g. when powering an electrically operated device such as a motor), the master controller identifies connected battery packs and gets charge information from each battery controller. If only one pack is present, that pack is discharged. When multiple battery packs are identified, the master controller selects as a first battery pack the battery pack with the highest charge level. The first battery pack is placed in a discharge mode by the master controller signaling the battery controller in the first battery pack to dose the switches in the battery pack to connect the rechargeable energy cells to an external load. As the first battery pack is discharged, the master controller compares its charge state to the charge state of a second remaining battery pack with the highest charge state. When the charge states of the first and second battery packs are within a threshold value, the master controller signals the battery controller in the second battery pack to place the second battery pack into the discharge mode, placing it electrically in parallel with the first battery pack connected to the external load, thus discharging multiple battery packs at the same time.

In some embodiments, the battery pack is designed to be removed from the energy storage system and replaced by the user. The battery pack includes a connector, which mates with a corresponding connector in the energy system, which is designed to place the battery pack in safe mode when the pack is removed.

DETAILED DESCRIPTION

Described herein are various embodiments of an energy storage system with swappable battery packs, and swappable battery packs for use with such a system.

The energy storage system comprises a master controller supporting one or more battery packs through a control buss connecting the master controller to a battery controller in each battery pack. Power contacts on the battery pack connect the battery pack to a power buss. A battery pack contains rechargeable storage cells, switches for isolating those cells from the power contacts, and battery sensors for monitoring the state of the cells in the battery and providing that information to the battery controller. The battery pack includes a current sensor for the battery monitor to measure charge and discharge current of the battery pack. The battery pack has a connector combining power and control contacts which mates to a corresponding connector in the energy storage system. The connector and battery design place the battery pack in a safe state as the connectors unmate during removal of the battery pack.

The master controller provides for charging and discharging battery packs connected electrically in parallel. Parallel charging allows multiple battery packs to be charged with a single charger. Discharging multiple battery packs in parallel offers not only greater capacity than available from a single battery pack, but also greater instantaneous current than available from a single battery pack. This is advantageous in electric vehicle applications as multiple battery packs operating in parallel can provide not only extended operating life when compared to a single battery pack, but can also provide improved performance as multiple battery packs operating in parallel can provide correspondingly greater current to a vehicle drive system. The battery packs are swappable, that is, removable and replaceable by the user, which is advantageous in electric vehicle applications, such as in an electric motorcycle application.

Figure 1:
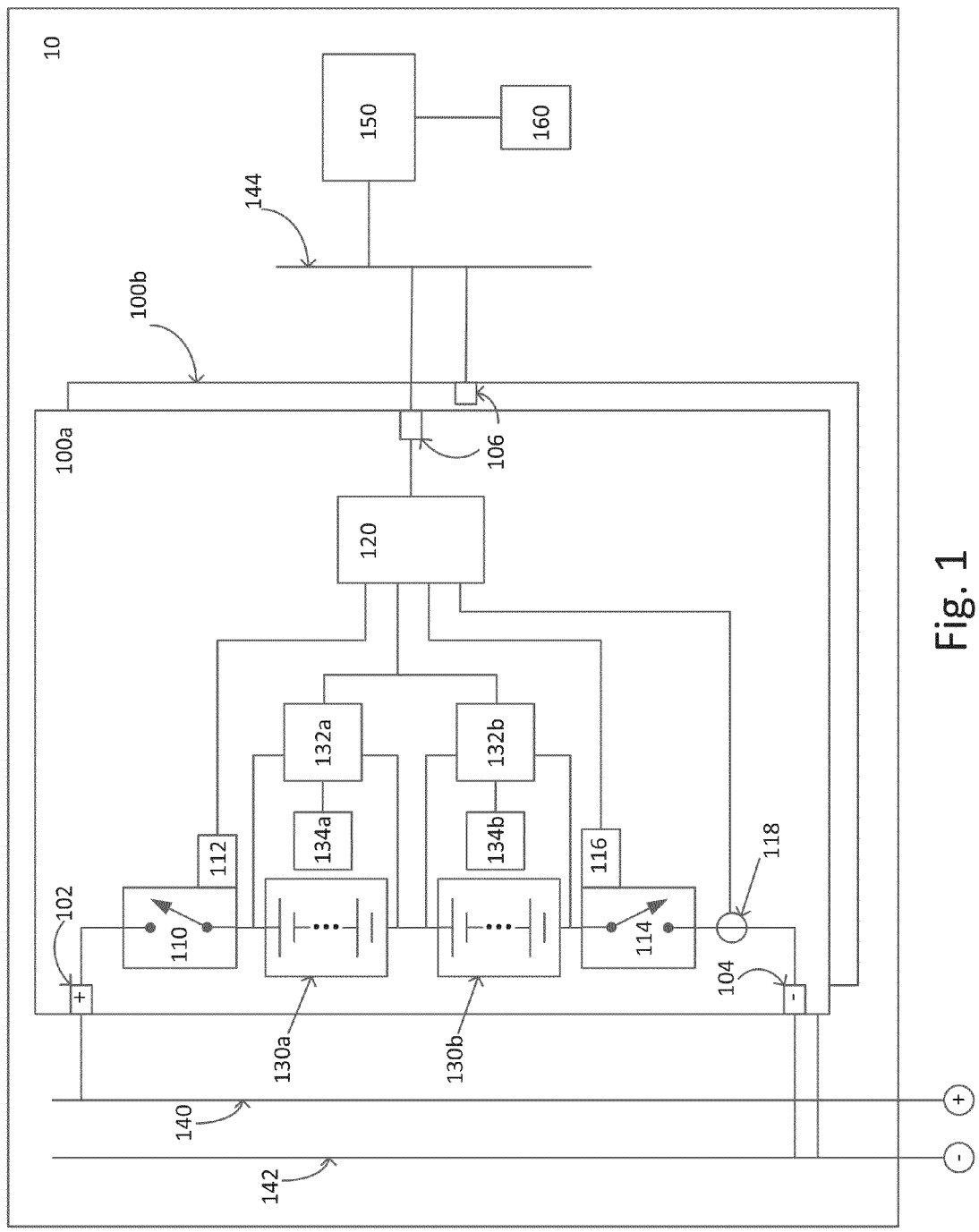
FIG. 1 is a block diagram of an energy storage system according to one embodiment.

Referring now to FIG. 1, a block diagram of an energy storage system 10 for using multiple battery packs can be seen. Energy storage system 10 comprises a master controller 150, battery packs 100a and 100b, positive power buss 140 and negative power buss 144. Positive power buss 140 and negative power buss 142 connect to external power sources or loads (not shown).

Battery pack 100a comprises a plurality of rechargeable storage cells 130a, 130b connected in series, switch 110 with driver 112 and switch 114 with driver 116 connecting the positive and negative ends of series connected rechargeable energy cells 130a, 130b to a positive power contact 102 and a negative power contact 104. A current sensor 118 is connected in the series circuit between negative power contact 104 and positive power contact 102. Battery controller 120 operates switches 110 and 114, senses current through current sensor 118, and senses operation of cells 130a, 130b through battery monitor 132a, 132b, and battery sensors 134a, 134b, and is in communication with master controller 150.

In battery pack 100a positive power contact 102 connects to positive buss 140, negative power contact 104 connects to negative buss 142, and control contact 106 connects to control buss 144. Battery controller 120 connects through control contact 106 to control buss 114 and master controller 150.

Battery controller 120 and master controller 150 may be any suitable microprocessor or system on a chip (SOC). One embodiment uses a Texas Instruments® Stellaris ARM Cortex-M3 SOC, providing a CPU, volatile and nonvolatile memory, and advanced I/O for each of battery controller 120 and master controller 150.

In one embodiment, rechargeable storage cells 130a, 130b are Lithium-ion chemistry cells, such as Lithium Nickel Manganese Cobalt oxide (NMC) cells. Other embodiments may employ different Lithium-ion chemistries.

Master controller 150 also communicates with I/O device subsystem 160. As an example for a vehicle application, output devices could include gauges for speed, predicted remaining operating time and/or distance, and an indicator such as a light or flag in a larger display to show when multiple battery packs are being used in parallel. Examples of input devices include key switches, throttles and operating mode switches such as run-off-charge.

In battery pack 100a, positive power contact 102 connects to a first terminal of normally open electrically operated switch 110. Switch 110 is controlled through driver 112 by battery controller 120. A second terminal of switch 110 connects to the positive terminal of rechargeable storage cells 130a.

In an embodiment switch 110 is a high power single pole single throw normally open relay, also known as a contactor, capable of handling the peak currents associated with battery pack operation. For a high energy battery pack such as that described herein, currents in the 200 to 400 amp range are expected. Such contactors are manufactured by companies such as White Rodgers™, Hubbell™, Curtis/Albright™, and others.

A contactor used as switch 110 is operated by placing a specified operating voltage across the contactor coil (not shown). This coil requires more voltage (and therefore current) to operate than can be handled directly by battery controller 120. Driver 112 interfaces between battery controller 120 logic levels and the power required to operate the coil of contactor 110. A suitable driver may be a power Field Effect Transistor (FET) or a power Insulated Gate Bipolar Transistor (IGBT).

In operation, a contactor coil requires more voltage to close the switch contacts, known as the pull-in voltage, than is required to hold the contacts in place, known as the holding voltage. In some contactors, the hold voltage (and therefore current) may be 10% of the pull-in voltage. In one embodiment, rather than provide a simple binary on or off drive signal to driver 112 to the contactor coil maintaining the pull-in voltage, a pulse-width modulated (PWM) drive signal is used. During a first pull-in time, battery controller 120 generates a PWM signal with a high duty cycle, producing a high average voltage across the contactor coil, activating the contactor and closing the switch 110 between positive power contact 102 and the positive terminal of rechargeable cells 130a. After this initial pull-in time, battery controller 120 generates a PWM drive signal with a lower duty cycle, producing a lower average voltage across the contactor coil, holding the contactor in its activated state while consuming less power in the contactor coil.

The negative end of rechargeable storage cells 130b is connected to a second, independent normally open electrically operated switch 114. Switch 114 is controlled through driver 116 by battery controller 120, and may be operated independently of switch 110. Switch 114 when closed connects the negative terminal of rechargeable storage cells 130b to negative power contact 104 which connects to negative power buss 142.

In one embodiment, switch 114 is a solid-state switch, which may comprise one or more solid state switching devices such as power FETs or IGBTs connected in parallel to handle the currents associated with battery pack operation. A suitable power FET is the International Rectifier® IRFP4568. Driver 116 interfaces switch 114 with battery controller 120, shifting the logic levels of battery controller 120 to the gate drive requirements needed to achieve low "on" resistance in power FETs.

It should be noted that other switch configurations are equally applicable. A contactor could be used for switch 114 and a solid state switch used for switch 110; in that case, the driver associated with the solid state switch would have to be modified for high-side drive.

Current sensor 118 provides information to battery controller 120 on the current flowing in to or out of rechargeable energy cells 130a, 130b. In one embodiment, current sensor 118 is a resistive current shunt. By placing a known low resistance between switch 114 and negative power contact 104, current flowing through the shunt produces a voltage drop across the shunt which is proportional to the current flowing through the shunt, according to Ohm's Law.

In another embodiment, current sensor 118 is a Hall-effect sensor, producing an output to battery controller 120 which is a function of sensing the magnetic field generated by current flow through the conductor between switch 114 and negative power contact 104.

Current sensor 118 may be located anywhere along the current path between positive power contact 102 and negative power contact 104, as the current flow through each element of a series connection is the same. Measured current flow will be the same if current sensor 118 is located between positive power contact 102 and first switch 112, between storage cells 130a and 130b, or as shown in FIG. 1 between switch 114 and negative power contact 104.

In one embodiment, rechargeable storage cells in groups 130a and 130b comprise individual rechargeable cells connected in series, each group of cells supported by a battery monitor circuit 132 and battery sensor 134 such as the Texas Instruments® PL536 battery monitor integrated circuit and supporting circuitry. Such an embodiment organizes individual cells in series strings of up to six cells each, and can provide battery controller 120 with individual cell voltages, temperature of the group of cells, and can support cell balancing during charging.

In one embodiment of battery pack 100a, storage cells 130a and 130b are implemented as 28 rechargeable storage cells, grouped into five series connected groups of cells; four groups of six series connected cells, and one group of four series connected cells. Each of these five groups of cells has a battery monitor 132 and battery sensor 134. In one embodiment, each cell is a Lithium Nickel Manganese Cobalt (NMC) pouch cell. This produces a battery pack with a nominal voltage of 102.2 Volts and a fully charged voltage of 116.2 Volts. Each NMC pouch cell has a capacity of between 23 and 25 Amp-hours, for a battery pack energy of between 2400 and 2800 Watt-hours. Peak current levels may exceed 200 Amps.

It is understood that in alternate embodiments of rechargeable storage cells 130a and 130b, smaller capacity cells, such as 2 to 3 Amp-hour cells may be placed in parallel, and these cell groups then placed in series.

Battery controller 120 is loaded with purpose-built firmware to operate switches 110 and 114, communicate with current sensor 118, battery monitors 132a, 132b, and communicate through control contacts 106 and control buss 144 with master controller 150 to operate battery pack 100 in charge and discharge operations as described herein.

Similarly, master controller 150 is loaded with purpose-built firmware to communicate with one or more battery pack controllers 120 to facilitate the process of placing battery packs 100 electrically in parallel during charging or discharging as described herein.

Placing two or more battery packs in parallel for charge or discharge operation has advantages. Charging multiple battery packs placed electrically in parallel allows for multiple battery packs to be charged from one external power source. Discharging multiple battery packs electrically in parallel provides an increase in energy available to an external load, which may be used to extend operating time, or may be used to increase performance by providing higher peak currents than available from one battery pack operating alone.

Multiple battery packs cannot be simply connected together in parallel. If the charge state of two battery packs differs significantly, connecting those battery packs in parallel will result in a very large current flow from the higher charged battery pack to the lower charged battery pack. Particularly with high energy battery packs, this is to be avoided; therefore, battery packs are connected in parallel once their charge states are within a predetermined threshold.

As an example, for the battery pack described herein having 28 NMC pouch cells and a nominal voltage of 102.2 Volts, a threshold voltage of approximately 3 volts is appropriate.

Figure 2:
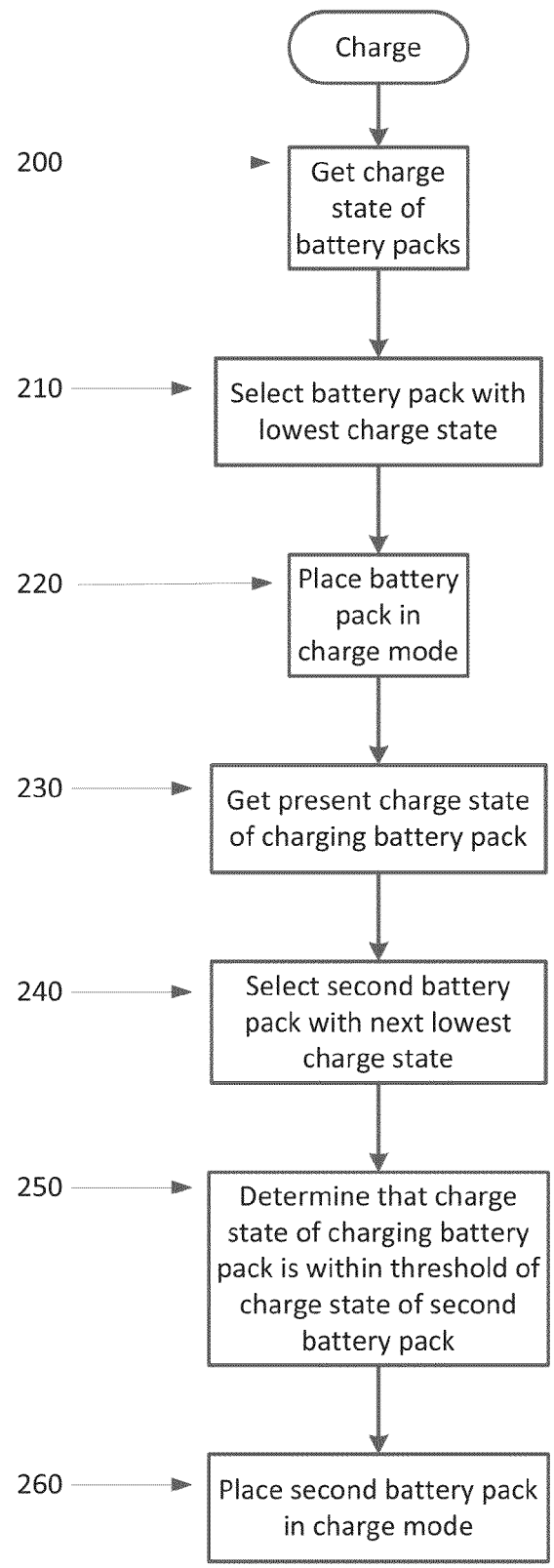
FIG. 2 is a flowchart showing a process for charging multiple battery packs according to one embodiment.
Figure 3:
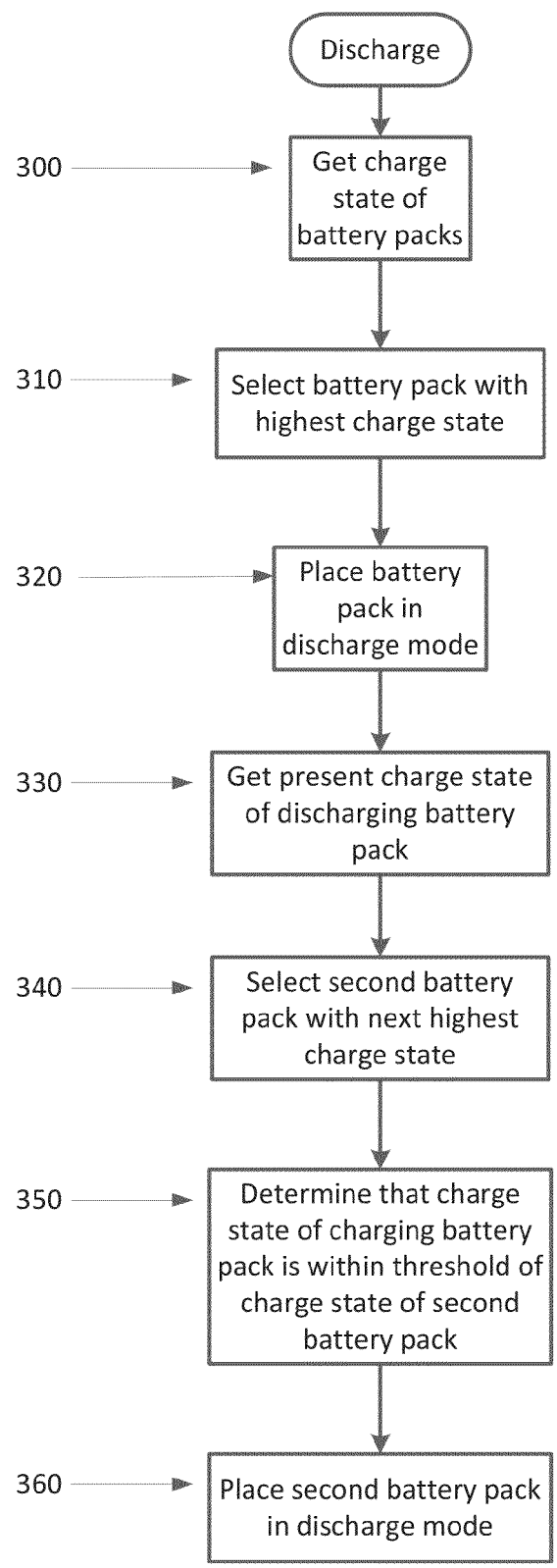
FIG. 3 is a flowchart showing a process for discharging multiple battery packs according to one embodiment.

Referring now to FIGS. 2 and 3, flowcharts showing charge and discharge operation of energy storage system 10 using a plurality of swappable battery packs 100 according to one embodiment may be seen. It should be understood that the descriptions and embodiments shown also operate with only one battery pack present, and while described with two battery packs, may support more than two battery packs.

In step 200 of FIG. 2, an initial charge state of the battery packs is determined. In one embodiment, this is accomplished by master controller 150 sensing the initial charge state of each of the one or more battery packs 100 by communicating with the battery controller 120 in each of the one or more battery packs.

In step 210, the battery pack with the lowest charge state is selected for charging. In one embodiment, this is accomplished by master controller 150 identifying a battery pack of the one or more battery packs having a lowest charge state. This battery pack will be referred to as the first battery pack in this charging process.

In step 220, the first battery pack is placed in charge mode, beginning the charging process with this first battery pack. In one embodiment, this is accomplished by master controller 150 directing battery controller 120 in the first battery pack 100 to place the battery pack in charge mode by closing switches 112, 114, connecting storage cells 130a, 130b in the first battery pack to an external power source (not shown) for charging via positive power buss 140 and negative power buss 142.

In step 230, the present charge state of the first battery pack is determined. In one embodiment, this is accomplished by master controller 150 determining the present charge state of the first battery pack placed previously in charge mode by getting the charge state from battery controller 120 of the first battery pack.

In step 240, a second battery pack to be charged is selected from the group of remaining battery packs by selecting the battery pack from that group having the lowest charge state. In one embodiment, this is accomplished by the master controller selecting a second battery pack from the remaining battery packs, the second battery pack having the lowest charge state of the remaining battery packs. Note that if only one battery pack is present, nothing is selected in this step.

In step 250, it is determined if the present charge state of the first battery pack is within a threshold value of the charge state of the second battery pack to be charged. In one embodiment, this is accomplished by determining in master controller 150 that the present charge state of the first battery pack is within a threshold value of the charge state of the second battery pack.

In step 260, the second battery pack is placed in charge mode, electrically in parallel with the first battery pack. In one embodiment, this is accomplished by master controller 150 directing battery controller 120 in second battery pack 100 to close switches 112, 114, connecting storage cells 130a, 130b in the second battery pack to the external power source for charging, electrically in parallel with first battery pack 100.

As examples of some of the many ways the charge process may be terminated, charging may be terminated by a user. Charging may be terminated by sensing termination criteria determined by the particular chemistry of storage cells 130a, 130b; such termination may be recognized by battery controller 120 or by master controller 150 operating in conjunction with battery controller 120. Charging may be terminated through fault conditions sensed by battery controller 120 and communicated to master controller 150.

Continuing to the discharge mode as shown in FIG. 3, in step 300 of FIG. 3, an initial charge state of the battery packs is determined. In one embodiment, this is accomplished by master controller 150 sensing the initial charge state of each of the one or more battery packs 100 by communicating with the battery controller 120 in each of the one or more battery packs.

In step 310, the battery pack with the highest charge state is selected for discharging. In one embodiment, this is accomplished by master controller 150 identifying a battery pack of the one or more battery packs having a highest charge state. This battery pack will be referred to as the first battery pack in the discharging process. The discharging process begins with this first battery pack.

In step 320, the first battery pack is placed in discharge mode. In one embodiment, this is accomplished by master controller 150 directing battery controller 120 in the first battery pack 100 to place the battery pack in discharge mode by closing switches 112, 114, connecting storage cells 130a, 130b in the first battery pack to an external load (not shown) for discharging via positive power buss 140 and negative power buss 142.

In step 330, the present charge state of the first battery pack is determined. In one embodiment, this is accomplished by master controller 150 determining the present charge state of the first battery pack placed previously in charge mode by getting the charge state from battery controller 120 of the first battery pack.

In step 340, a second battery pack to be charged is selected from the group of remaining battery packs by selecting the battery pack from that group having the highest charge state. In one embodiment, this is accomplished by the master controller selecting a second battery pack from the remaining battery packs, the second battery pack having the highest charge state of the remaining battery packs. Note that if only one battery pack is present, nothing is selected in this step.

In step 350, it is determined if the present charge state of the first battery pack is within a threshold value of the charge state of the second battery pack to be discharged. In one embodiment, this is accomplished by determining in master controller 150 that the present charge state of the first battery pack is within a threshold value of the charge state of the second battery pack.

In step 360, the second battery pack is placed in discharge mode, electrically in parallel with the first battery pack. In one embodiment, this is accomplished by master controller 150 directing battery controller 120 in second battery pack 100 to close switches 112, 114, connecting storage cells 130a, 130b in the second battery pack to the external load for discharging, electrically in parallel with first battery pack 100.

As examples of some of the many ways the discharge process may be terminated, discharge may be terminated by a user. Discharge may be terminated by battery controller 120 sensing termination criteria determined by the particular chemistry of cells 130a, 130b. Discharge may be terminated by switching energy storage system 10 to charge mode to recharge depleted battery packs 100a, 100b. Discharge may be terminated by a user swapping out a battery pack 100.

In an embodiment of the charge and discharge processes shown in FIGS. 2 and 3 and detailed herein, master controller 150 may update displays in /O subsystem 160, for example showing percentage of charge, time remaining, and the like.

Figure 4:
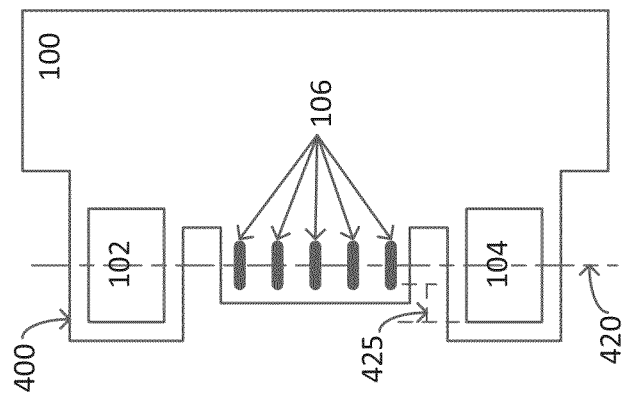
FIG. 4 shows mating connectors according to one embodiment.
Figure 4:
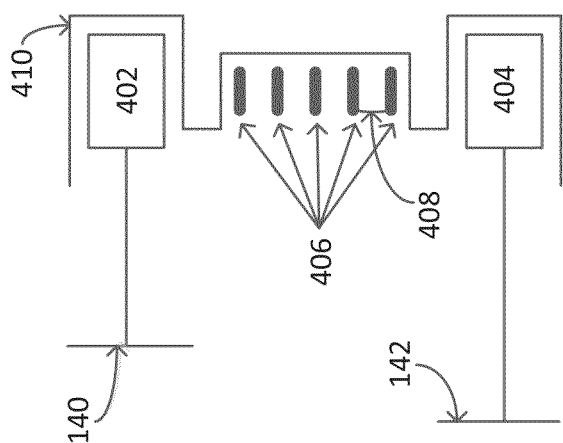

Referring now to FIG. 4, connectors for use with swappable battery packs of the energy storage system described herein are shown. The figure shows a representation of a battery pack connector 400 for use on battery pack 100, which mates with an energy storage system connector 410 elsewhere in energy storage system 10. Connector 410 may be part of a wiring harness in energy storage system 10, or may be mounted in a structure (e.g. in an electric vehicle not shown) for receiving battery pack 100.

In energy storage system connector 410, positive buss 140 connects to a contact 402. This mates with a positive battery pack contact 102 in battery pack connector 400. Similarly, a negative battery pack contact 104 in battery pack connector 400 mates with a contact 404 in energy storage system connector 410 which connects to negative supply buss 142.

Power contacts 102 and 402, 104 and 404, are designed to pass the full discharge current of the charged battery pack. A suitable power contact according to one embodiment is a flat wiping genderless Powerpole connector from Anderson Power Products®. Other connectors with suitable current ratings may also be used.

Control contacts 106 of battery pack connector 400 from battery pack 100 mate with contacts 406 on energy storage system connector 410 which connect to control buss 144. As the signals on these control contacts 106, 406 are low level, many different contact types may be used.

As shown in the figure, power and control contacts are physically arranged such that the power contacts 102 and 402, 104 and 404 mate first when battery pack connector 400 and energy storage system connector 410 are joined, and unmate last when battery pack connector 400 and energy storage system connector 410 are separated. Control contacts 106 and 406 mate last and unmate first. The mating sequence therefore is power contacts mate, then control contacts mate. The unmating sequence is control contacts unmate, then power contacts unmate.

This sequencing is obtained, for example, through the relative physical sizes of the power contacts 102 and 402, 104 and 404, and control contacts 106 and 406, and by the relative positioning of control contacts 106 to the power contacts 102 and 104 in each connector.

As an example, a 120 Amp Powerpole connector used for power contacts 102, 104, has a contact surface which is 0.84 inches (21.3 mm) in length. When two of these genderless flat wiping contacts, such as power contact 102 in battery pack connector 400 mating with power contact 402 in energy storage system connector 410, the majority of this 0.84 inch contact surface in each contact touches its mating contact, thus this contact has a wiping length of 0.84 inches.

In contrast, the smaller pin and socket contacts typically used in miniature D-sub connectors (e.g. DE9, DE15, and DE25 used in computers and communications equipment) have a wiping length of 0.25 inches.

By aligning power and control contacts so the middle of the wiping length of each contact in the connector is aligned 420, both power and control contacts fully mate. For the contacts of the example given, the middle of the 0.84 inch wiping length for a power contact such as 102, 104 is 0.42 inches. Similarly, the middle of the 0.25 inch wiping length for a control contact such as 106 is 0.125 inches. In a symmetric embodiment, aligning the middle of the length for these contacts, shown as 420 in the figure, is the same as spacing the control contacts 0.42 inches-0.125 inches, or 0.295 inches back from the front of power contacts 102, 104, shown as 425 in the figure. When battery pack connector 400 and energy storage system connector 410 are mated, because of this alignment, power contacts 102 and 402, 104 and 404 will be connected and overlap approximately 0.295 inches before control contacts 106, 406 make initial contact. Similarly, when battery pack connector 400 and energy storage system connector 410 are unmated, when control contacts 106 and 406 have separated, power contacts 102 402, and 104, 404 are still connected with approximately 0.295 inches of travel until the connection is broken.

Many other embodiments are possible, relying on difference in the lengths of the two types of contacts. As an example, energy storage system connector 410 could be implemented so that the front surfaces of all contacts 402, 404, 406 are aligned. This would require that contacts 106 in mating battery pack connector 400 be set back from connectors 102 and 104.

When battery pack 100 is not connected, it is in a safe state with one or both of switches 110 114 in their off state, isolating power contacts 102 104 from storage cells 130a 130b. When battery pack 100 is inserted into energy system 10, mating battery pack connector 400 and energy storage system connector 410, master controller 150 senses battery pack 100. This may be done, for example, by master controller 150 polling control buss 144 periodically for inserted battery packs. In an alternate embodiment, inserting battery pack 100 may generate an interrupt on master controller 150 indicating that a battery pack has been inserted.

When battery pack 100 is removed from energy storage system 10, control contacts 106 and 406 unmate in the first few millimeters of battery pack motion. This unmating event is recognized by battery controller 120, which places the battery pack in safe mode by opening one or both of switches 110 and 114. This action insures that current flow from energy cells 130a 130b through power contacts 102 402 and 104 404 has been interrupted prior to those power contacts unmating.

In one embodiment, this unmating may be detected by loss of communications with master controller 150 through buss 144 and contacts 406 and 106.

Mating and unmating may also be recognized by battery controller 120 for example by a dedicated presence signal on control buss 144 and control connector 406. A logic "1" signal may be placed on one control line for example by master controller 150, or by a hard-wired pull-up; battery pack 100 provides a pull-down on this line, which is fed to battery controller 120. When battery pack 100 is connected, this control line will be pulled up to a logic "1" at battery controller 120, and when the battery pack is disconnected the control line will be pulled down to a logic "0" which is sensed by battery controller 120 to place the battery pack in safe mode. Logic levels may be inverted depending on the implementation.

In a further embodiment, a loopback line 408 may be provided on control contacts 406. This loopback line may be used by battery controller 120 to sense when the battery pack is connected or disconnected. Disconnection places the battery pack in safe mode.

In an alternative embodiment, a sense line or a loopback line may also be used to enable and disable the drivers 112, 116 for either or both of switches 110 and 114 at a hardware level independent of battery controller 120. Enabling and disabling switch drivers 112, 116 based on a control line or loopback provides a hardware failsafe which insures that battery controller 120 can only place the battery pack in a charge or discharge state when connected to the energy system, and that power from energy cells 130a 130b to power contacts 102 104 is cut without requiring action from battery controller 120.

It is to be understood that the examples given are for illustrative purposes only and may be extended to other implementations and embodiments with different conventions and techniques. While a number of embodiments are described, there is no intent to limit the disclosure to the embodiment(s) disclosed herein. On the contrary, the intent is to cover all alternatives, modifications, and equivalents apparent to those familiar with the art.

In the foregoing specification, the invention is described with reference to specific embodiments thereof, but those skilled in the art will recognize that the invention is not limited thereto. Various features and aspects of the herein-described invention may be used individually or jointly. Further, the invention can be utilized in any number of environments and applications beyond those described herein without departing from the broader spirit and scope of the specification. The specification and drawings are, accordingly, to be regarded as illustrative rather than restrictive. It will be recognized that the terms "comprising," "including," and "having," as used herein, are specifically intended to be read as open-ended terms of art.

We claim:

1. An energy storage system comprising:
    one or more battery packs, each battery pack having:
        a set of storage cells which are rechargeable and connected in series, the set of storage cells having a positive terminal and a negative terminal,
        a first switch connected to the positive terminal of the set of storage cells, the first switch having a driver,
        a second switch connected to the negative terminal of the set of storage cells, the second switch having a driver,
        a positive power contact configured to connect to a positive supply bus, the positive power contact connected to the first switch,
        a negative power contact configured to connect to a negative supply bus, the negative power contact connected to the second switch,
        a current sensor located along an electrical path between the positive power contact and the negative power contact,
        one or more battery monitors connected to one or more storage cells of the set of storage cells, each battery monitor further having a battery sensor for sensing a condition of the one or more storage cells of the set of storage cells,
        a control contact configured to connect to a control bus,
        a battery controller connected to the first switch driver, the second switch driver, the current sensor, the one or more battery monitors, and the control contact,
    and
    a master controller coupled to the control contact of each of the one or more battery packs through the control bus, and configured to communicate with the battery controller of each of the one or more battery packs to control charge or discharge of the one or more battery packs electrically in parallel.

2. The energy storage system of claim 1 where the first switch is a contactor.

3. The energy storage system of claim 2 where the contactor has a coil driven by the battery controller through the first switch driver or the second switch driver with a pulse width modulated signal having a high duty cycle producing a first voltage across the coil for a predetermined pull-in time, switching to a second lower duty cycle producing a lower voltage across the coil.

4. The energy storage system of claim 1 where the second switch is a semiconductor switch.

5. The energy storage system of claim 4 where the semiconductor switch comprises one or more power FETs.

6. The energy storage system of claim 4 where the semiconductor switch comprises one or more power IGBTs.

7. The energy storage system of claim 1 where the current sensor is a current shunt.

8. The energy storage system of claim 1 where the current sensor is a Hall effect sensor.

9. The energy storage system of claim 1 where the positive and negative power contacts and control contacts are mounted together in alignment in a connector such that removing a battery pack from the energy storage system opens the control contacts prior to opening the positive and negative power contacts.

10. The energy storage system of claim 9 where removing a battery pack places the battery pack into a safe mode by opening at least one of the first switch or the second switch.

11. The energy storage system of claim 10 where opening at least one of the first switch or the second switch is performed by the battery controller.

12. The energy storage system of claim 10 where opening at least one of the first or second switches is performed by a hardware failsafe.

13. The energy storage system of claim 1 where the rechargeable storage cells are Lithium-ion cells.

14. A method of charging one or more battery packs in an energy storage system, the method comprising:
   sensing an initial charge state of each of the one or more battery packs by a master controller communicating with a battery controller in each of the one or more battery packs,
   identifying, by the master controller, a first battery pack of the one or more battery packs, the first battery pack having a lowest charge state of the one or more battery packs,
   placing the first battery pack in a charge mode by the master controller directing the battery controller in the first battery pack to close one or more electrical connections between a set of storage cells in the first battery pack and an external power source,
   monitoring the first battery pack to determine a present charge state of the first battery pack by the master controller,
   selecting a second battery pack from any remaining one or more battery packs, a charge state of the second battery pack being the lowest charge state of the remaining one or more battery packs, the selecting is made by the master controller,
   determining that the present charge state of the first battery pack and the charge state of the second battery pack are within a threshold,
   and
   placing the second battery pack in the charge mode by the master controller directing the battery controller in the second battery pack to close one or more electrical connections between a set of storage cells in the second battery pack and the external power source.

15. A method of discharging one or more battery packs in an energy storage system, the method comprising:
   sensing an initial charge state of each of the one or more battery packs by a master controller communicating with a battery controller in each of the one or more battery packs,
   identifying, by the master controller, a first battery pack of the one or more battery packs, the first battery pack having a highest charge state of the one or more battery packs,
   placing the first battery pack in a discharge mode by the master controller directing the battery controller in the first battery pack to close one or more electrical connections between a set of storage cells in the first battery pack and an external load,
   monitoring the first battery pack to determine a present charge state of the first battery pack by the master controller,
   selecting a second battery pack from any remaining one or more battery packs, the second battery pack having the highest charge state of the remaining one or more battery packs, the selecting is made by the master controller,
   determining that the present charge state of the first battery pack and the charge state of the second battery pack are within a threshold,
   and
   placing the second battery pack in the discharge mode by the master controller directing the battery controller in the second battery pack to close one or more electrical connections between a set of storage cells in the second battery pack and the external load.

* * * * *